No. 614,055. Patented Nov. 8, 1898.
W. G. KENDALL.
CUSHION TIRE.
(Application filed Oct. 7, 1898.)
(No Model.)
Fig. 1.   Fig. 2.
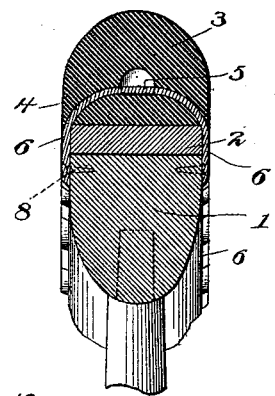
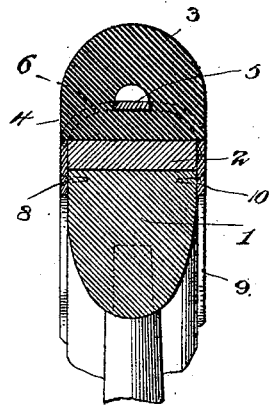
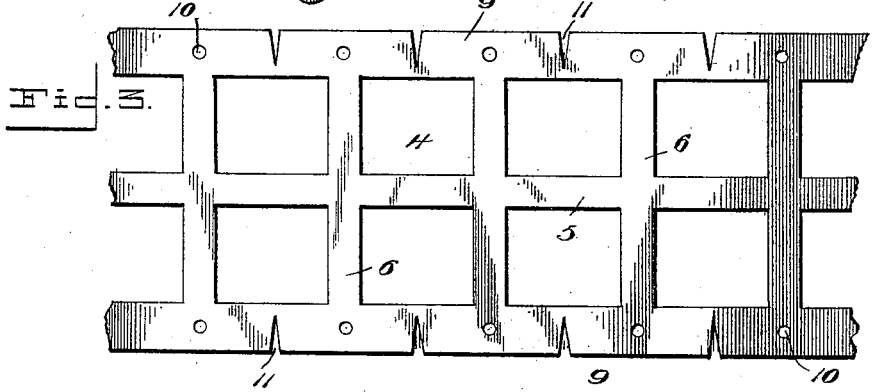
Fig. 3.
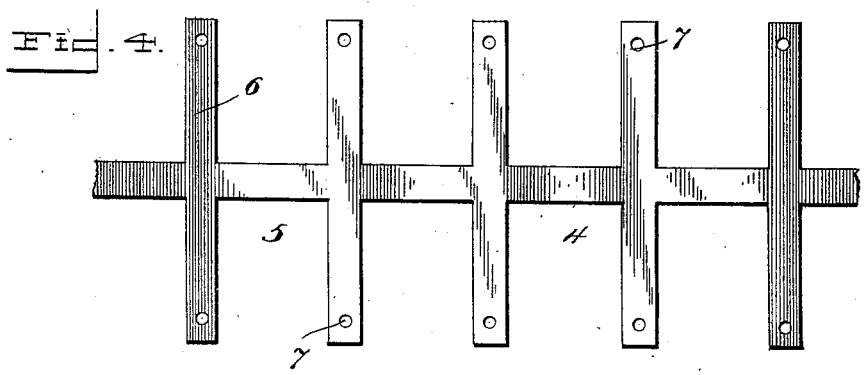
Fig. 4.
Witnesses:  Inventor:
Jno Smith  W. G. Kendall
Nellie Yates  By J. R. Nottingham
  Attorney.
THE NORRIS PETERS CO., PHOTO-LITHO., WASHINGTON, D. C.

UNITED STATES PATENT OFFICE.

WEBBER G. KENDALL, OF PROVIDENCE, RHODE ISLAND, ASSIGNOR TO THE KENDALL RUBBER TIRE COMPANY, OF SAME PLACE.

CUSHION-TIRE.

SPECIFICATION forming part of Letters Patent No. 614,055, dated November 8, 1898.

Application filed October 7, 1898. Serial No. 692,947. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to cushion-tires for vehicle-wheels; and it consists, essentially, of a central reinforcing band or plate embedded in the rubber tire longitudinally of its length, having securing-straps projecting from each side thereof through either the sides or the inner periphery of the rubber tire.

The invention further consists in the general construction and relative arrangement of the several parts of the tire as a whole and the manner in which said tire is secured onto the wheel.

The principal object of the invention is the production of a tire of the character mentioned that can be readily applied to wheels now in use without the employment of specially-constructed rims.

Another and especial object of the invention is to so reinforce the tire that it will possess the requisite amount of strength and be sufficiently durable to withstand the sudden jars and shocks to which it may be subjected without in the least impairing its elasticity or cushioning effect.

Other objects of the invention will be apparent as the device is more fully explained.

These objects are attained by means of the mechanism illustrated in the accompanying drawings, in which—

Figure 1 is a transverse sectional view of the rim of a wheel and my improved tire applied thereto. Fig. 2 is a similar view showing a modified form of the devices for securing the tire onto the wheel; Fig. 3, a plan view of a portion of the reinforcing band or plate provided with the securing devices shown in Fig. 2, and Fig. 4 a plan view of a portion of the reinforcing band or plate provided with the securing means shown in Fig. 1.

Referring to the several views of the drawings, the numeral 1 indicates the felly or rim of an ordinary vehicle-wheel, and 2 the metal tire thereof.

The numeral 3 indicates the rubber tire, which may be made in one or more sections or pieces, and 4 the metal reinforcing and securing band or plate. This band or plate is composed, preferably, of a central strip 5, having straps 6 projecting from each side thereof, and is embedded or molded in the rubber tire in such manner that the strip 5 will be in the longitudinal center of the tire and the straps 6 projecting laterally therefrom and preferably through the bottom or inner periphery of said tire. The free ends of each strap is provided with an aperture 7, through which passes a screw 8, by means of which the rubber tire is secured onto the wheel.

In molding the tire the band 4 is so positioned in the mold that it will be embedded in the rubber a suitable distance above the bottom or the inner periphery of the tire, with the securing-straps projecting downwardly through the bottom or inner periphery of said tire. However, the method I prefer for molding the tires is by molding them in two longitudinal sections in the molds, then placing the band 4 between the two sections and placing on the central strip 5 of the band a suitable core. I then bring the two sections of the mold and the molded rubber therein together and subject them to heat. The rubber of the two sections will be softened and run together, after which they are vulcanized. After the tire has been suitably vulcanized I remove the mold and then withdraw the core, thereby providing a longitudinal channel through the tire for the purpose of providing a greater cushioning effect. The tire thus constructed will have embedded therein a suitable band 4, provided with the downwardly-projecting securing-straps and a channel 5, extending longitudinally throughout the entire length of the tire, for the purpose aforementioned. In Fig. 3 I have shown a modification of this band 4 and securing-straps, wherein the free ends of the securing-straps are joined together by a strip 9, provided with aperture 10, by means of which the tire may be secured onto the wheel instead of being secured directly by the straps 6. For the purpose of permitting the strap 9 to conform to the curve of the wheel, if molded in straight sections, I provide the outer edges with V-shaped formations 11, as shown. These bands and straps may be either bent before they are embedded in the tire or afterward, as desired. The securing-straps may project from the sides of the tire, but I prefer that they should project through the bottom or inner periphery, as a greater elasticity is given the rubber of the tire. The straps instead of coming out at the lower edge and bottom, as shown in the drawings, may project directly outward and then bend down at right angle.

Having thus fully described my invention, what I claim as new, and desire to secure by Letters Patent, is—

1. A cushion-tire, composed of one or more sections or pieces, each section having embedded therein a reinforcing-band, consisting of a central longitudinal strip, a longitudinal channel above the same, said strip having integral side straps projecting downwardly through the tire, said straps provided with means, whereby said tire may be secured onto the wheel.

2. A cushion-tire, composed of one or more sections or pieces, each section having embedded therein a central reinforcing and securing band, consisting of a central longitudinal solid strip having integral side straps projecting downwardly through the tire, the free ends of said straps on each side, being connected together by a continuous strip provided with means by which the tire may be secured onto the wheel.

3. A cushion-tire, composed of one or more sections or pieces, each section having embedded therein a central reinforcing and securing band, consisting of a central longitudinal solid strip having integral side straps projecting downwardly through the tire, the free ends of said straps, on each side, being connected together by a continuous strip provided with V-shaped formations in the outer edge thereof and with suitable bolt-holes, as specified.

In testimony whereof I affix my signature in the presence of two witnesses.

WEBBER G. KENDALL.

Witnesses:
F. T. F. JOHNSON,
J. R. NOTTINGHAM.